United States Patent

Ichino et al.

[11] Patent Number: 5,983,027
[45] Date of Patent: Nov. 9, 1999

[54] LENS-FITTED FILM UNIT WITH BODY-BAND LABEL

[75] Inventors: Shuichi Ichino; Hideo Tomizawa, both of Kanagawa, Japan

[73] Assignee: Fuji Photo Film Co., Ltd., Kanagawa, Japan

[21] Appl. No.: 09/190,214

[22] Filed: Nov. 13, 1998

[30] Foreign Application Priority Data

Nov. 13, 1997 [JP] Japan .................................. 9-311786

[51] Int. Cl.⁶ .................................................. G03B 17/24
[52] U.S. Cl. ......................................................... 396/6
[58] Field of Search .................... 396/6, 25, 29, 396/535

[56] References Cited

U.S. PATENT DOCUMENTS 5,151,309  9/1992  Dollinger .................................. 428/40

FOREIGN PATENT DOCUMENTS 3-56930  5/1991  Japan .
5-8559   2/1993  Japan .

Primary Examiner—David M. Gray
Attorney, Agent, or Firm—Young & Thompson

[57] ABSTRACT

A lens-fitted film unit has a light tight unit body made up of a main body assembly including at least an exposure mechanism and injection molded polystyrene front and rear covers between which the main body assembly is interposed and a looped body-band label fitted to the light tight unit body. The looped body-band label is made of a polypropylene film sheet only, or otherwise a polypropylene film sheet laminated with a polystyrene film sheet, which has a thickness less than approximately 60 $\mu$m. The polypropylene film sheet has a tensile strength greater than approximately $7\times10^3$ N/m and a bending moment less than approximately $3\times10^{-4}$ N·m and has a weight less than 1.5% with respect to the total weight of the injection molded polystyrene front and rear covers.

8 Claims, 3 Drawing Sheets

LENS-FITTED FILM UNIT WITH BODY-BAND LABEL

BACKGROUND OF THE INVENTION

1. Field of the Invention

The invention relates to a lens-fitted film unit with a body-band label.

2. Description of Related Art

There are lens-fitted film units on the market which are inexpensive and make one easily enjoy taking pictures. Such a lens-fitted film unit has a case in which a simple exposure mechanism including a taking lens and a shutter and a roll of film are contained and which is covered with a decorative wrap. The lens-fitted film unit is widely spread because of the convenience that it can be gotten whenever and anywhere wishing to take pictures and is put to a photo-shop as it is for processing and printing, and because the lens-fitted film unit is available at a low price. The lens-fitted film unit typically has a shell comprised of front and rear cover sections between which a base section in which a roll of film and an exposure mechanism are installed is interposed. These base section and covers are made of plastic such as polystyrene. A decorative wrap of the lens-fitted film unit is consists of a paper bag printed with a product name, a proprietary name, logotypes and vignettes thereon.

In recent years, it is a new trend to use body-band labels in place of the decorative wrap. Such a body-band label, which is made of a synthetic paper sheet such as "YUPO" (trade name of Oji Oil & Chemical Co., Ltd.), is tied round and pasted on a shell of the lens-fitted film unit to cover the shell excepting opposite end portions, which is desirable for making the lens-fitted film unit be easily put together and increase tightness between the front and rear cover sections. The lens-fitted film unit covered by the body-band label provides a smaller apparent overall size as compared with the conventional lens-fitted film unit fully covered or wrapped by a paper bag type of wrap.

Meanwhile, it has been hastened to recycle used lens-fitted film units for the purpose of saving natural resources and reducing industrial wastes. Used lens-fitted film units put to photo-shops are sent to a photo-laboratory for processing exposed films. The units with a film withdrawn are collected by the manufacturer and taken apart to pieces or parts. Some pieces are recovered as they are for reuse as parts of lens-fitted film units. The remaining pieces are recycled as raw materials. Specifically, plastic front and rear covers and body-band labels of the lens-fitted film units are melted to provide raw material pellets.

Because polystyrene and the synthetic paper sheet "YUPO" are unfavorable with each other in view of compatibility, in the case where the polystyrene covers and the body-band labels made of synthetic paper sheet "YUPO" are melted together, if the "YUPO" content of a melt mixture is higher than several percent in weight, the polystyrene changes its physical properties and is hard to be recycled as a material for the covers of the lens-fitted film unit. For this reason, it is essential to peel apart the body-band label from the lens-fitted film unit before taking the lens-fitted film unit apart pieces and to melt the polystyrene parts separately from the body-band label, which are always inefficient for recycling processes. This problem is possibly solved by employing a body-band label made of a polystyrene film sheet so as to enable polystyrene parts to be melted together with the body-band label. However, because a polystyrene film sheet is poor in tensile strength as compared with a synthetic paper sheet ("YUPO"), the polystyrene body-band label is possibly torn if the lens-fitted film unit is accidentally dropped down onto a hard surface such as a floor, a road and so forth. A thick polystyrene film sheet is unsuitable for the body-band label for lack of flexibility. Specifically, the body-band label made of thick polystyrene film sheet easily comes off from, in particular, curved part of a shell of the lens-fitted film unit.

SUMMARY OF THE INVENTION

It is accordingly an object of the invention to provide a lens-fitted film unit equipped with a body-band label which provides suitability for recycling parts thereof.

The foregoing object of the invention is accomplished by providing a lens-fitted film unit which comprises a light tight unit body made up of a main body assembly including at least an exposure mechanism and injection molded polystyrene front and rear covers between which the main body assembly is interposed, a roll of film installed into the main body assembly, and a looped body-band label fitted to the light tight unit body. The looped body-band label being made of a polypropylene film sheet with a thickness less than approximately 60 $\mu$m, a tensile strength equal to or greater than approximately $7\times10^3$ N/m and a bending moment equal to or less than approximately $3\times10^{-4}$ N·m, and having a weight less than 1.5% with respect to a total weight of the injection molded polystyrene front and rear covers.

The body-band label may be made of a laminate film sheet with a tensile strength equal to or greater than approximately $7\times10^3$ N/m and a bending moment equal to or less than approximately $3\times10^{-4}$ N·m which comprises a polypropylene film sheet with a thickness less than approximately 60 $\mu$m and a polystyrene film sheet and has a polypropylene content is less than 1.5 weight % with respect to a total weight of the injection molded polystyrene front and rear covers.

The laminate film sheet further comprises an aluminum deposition layer interposed between said polypropylene film sheet and said polystyrene film sheet.

The body-band label is adhered to the unit body of the lens-fitted film unit by an adhesive layer of at least one of an acrylic group of adhesives and a rubber group of adhesives.

According to one aspect of the invention, since the utilization is made of a polypropylene film sheet with a tensile strength greater approximately $7\times10^3$ N/m for the body-band label fitted and adhered to the body unit of the lens-fitted film unit, there is provided a significant improvement in strength of the body-band label against impact exerted on the unit body when the lens-fitted film unit is dropped. Furthermore, since the utilization is made of a polypropylene film sheet with a bending moment less than approximately $3\times10^{-4}$ N·m for the body-band label fitted and adhered to the body unit of the lens-fitted film unit, the body-band label is sufficiently flexible to be fitted to the unit body and prevented from lifting and peeling off from, in particular, curved portion of the unit body during using.

According to another aspect of the invention, the polypropylene content of the body-band label is less than 1.5 weight % with respect to the total weight of the injection. molded polystyrene front and rear covers, which provides improved compatibility of the polypropylene body-band label with the polystyrene covers with an effect of preventing a change in physical properties of a molten polystyrene material, which is desirable for parts of the used lens-fitted film unit to be reused. The acrylic group of adhesives and the rubber group of adhesives do not adversely affect to the physical properties of the recycled polystyrene material.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1:
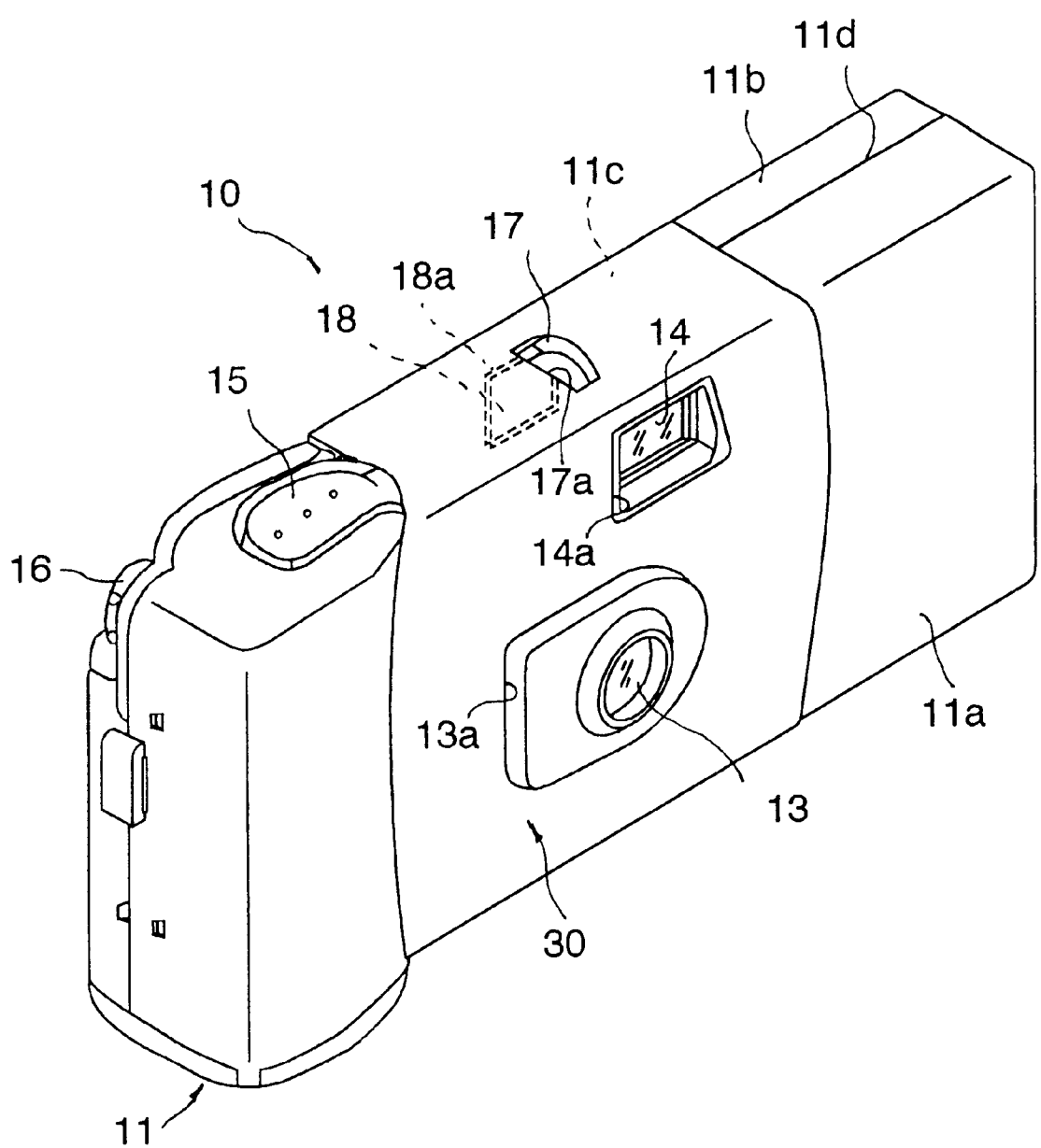
FIG. 1 is a schematic view showing an outer appearance of a lens-fitted film unit in accordance with an embodiment of the invention.

Referring to the accompanying drawings in detail, in particular, to FIG. 1 showing a lens-fitted film unit 10, a generally rectangularly-shaped unit body 11, which is suitably made of plastic, has a taking lens 13 and a viewfinder objective window 14 installed to its front wall 11a, a shutter release button 15, a film advance knob 16 and a frame counter window 17 installed to its top wall 11b, and a viewfinder eyepiece window 18 installed to its back wall 11c. The unit body 11 is wrapped partly by a looped body-band label 30. The looped body-band label 30 having an outer surface on which decorative vignettes, a product name, a proprietary name and other logotypes are printed is formed with openings 13a, 14a, 17a and 18a for the taking lens 13, the viewfinder objective window 14, the frame counter window 17 and the viewfinder eyepiece window 18, respectively and adhered in position to the unit body 11.

Figure 2:
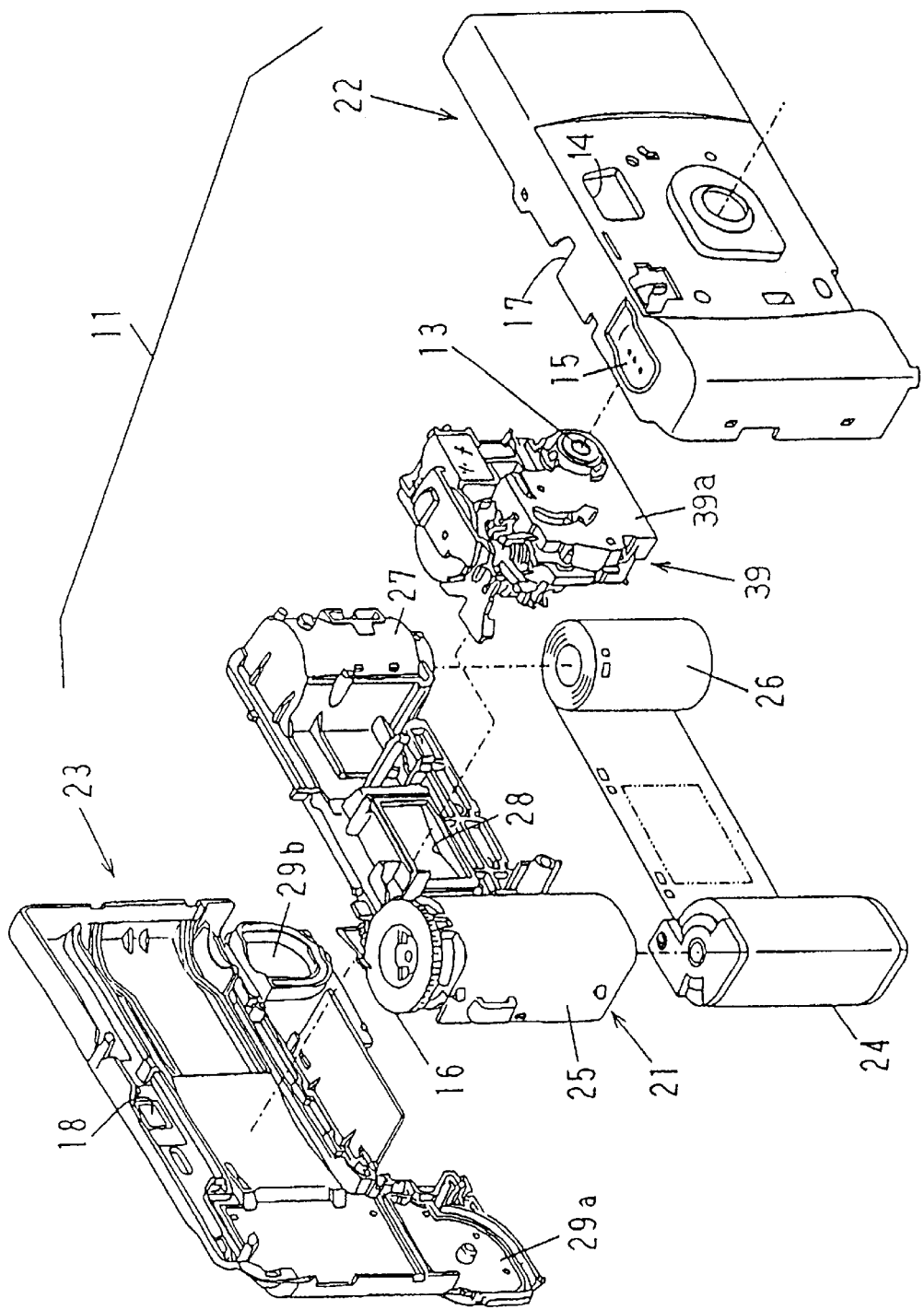
FIG. 2 is an exploded view of the lens-fitted film unit shown in FIG. 1.

As shown in FIG. 2, the unit body 11 has a generally rectangular box-shaped light tight outer shell made up of two mating shell halves cover, namely front and rear covers 22 and 23, in which an internal main body 21 is interposed. These main body 21 and front cover 22 and rear cover 23 are formed as injection molded polystyrene parts. The front and rear covers 22 and 23 The main body 21 is provided with an open-bottomed cartridge chamber 25 for receiving a film cartridge 24 and an open-bottomed film chamber 27 for receiving a roll of unexposed film strip 26 at opposite ends and formed with an exposure aperture 28 disposed between the cartridge chamber 25 and the film chamber 27. The rear cover 23 is provided with flap type bottom lids 29a and 29b connected thereto by flexible hinges for closing bottom openings of the cartridge chamber 25 and the film chamber 27, respectively. The main body 21 is provided with the film advance knob 16 attached to the top of the cartridge chamber 25 and an exposure unit 39 fronting on the exposure aperture 28. This exposure unit 39 comprises various exposure elements, such as a viewfinder optical system, a film advance mechanism, a shutter mechanism, including the taking lens 13 assembled to a base board 39a.

Figure 3:
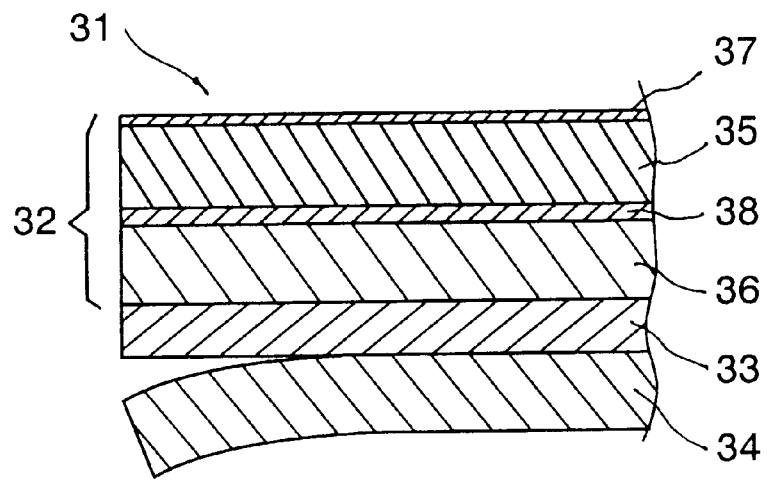
FIG. 3 is an enlarged cross-sectional view of a laminate film sheet of which a body-band label is made.

FIG. 3 shows a structure of film sheet 31 of which the body-band label 30 is made up. The film sheet 31 comprises a laminate film sheet 32 with an adhesive layer 33 covered by a peel-apart type of protective film sheet 34. The laminate film sheet 32 comprises an outer film sheet 35 made of a polypropylene film sheet (PP) having a thickness less than approximately 60 $\mu$m and an inner film sheet 36 made of a polystyrene film sheet (PS) having a thickness between approximately 30 and 50 $\mu$m. The outer film sheet 35 is coated with an aluminum layer 38 vapor deposited onto the back thereof and is printed with decorative vignettes, a product name, a proprietary name and other logotypes, schematically shown by a print layer 37, on the front thereof. The laminate film sheet 32 including the aluminum deposition layer 38 is preferably of less than approximately 80 $\mu$m in overall thickness so as to have a tensile strength of approximately $7 \times 10^3$ N/m or higher and a bending moment of approximately $3 \times 10^{-4}$ N·m or less. The aluminum deposition layer 38 is effective to provide the laminate sheet 32 with a light shield. The laminate sheet 32 at its back is coated with the adhesive layer 33 preferably of an acrylic group or a rubber group which is covered by the protective film sheet 34. Accordingly, the film sheet 31 is of a self-adhesive type.

Figure 4:
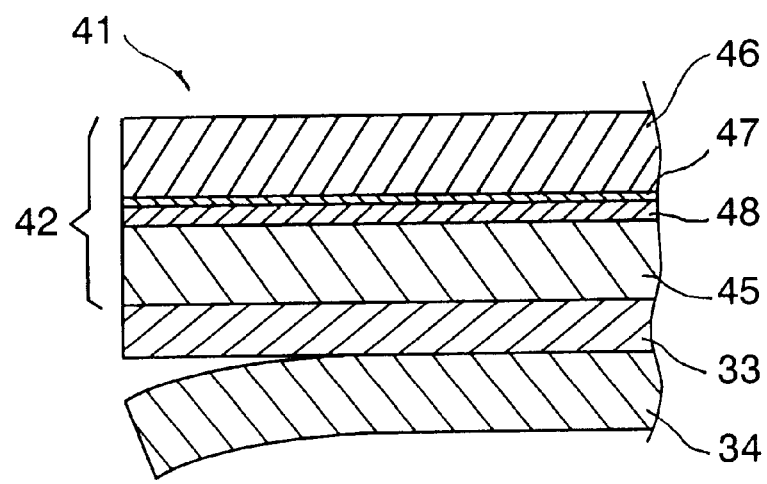
FIG. 4 is an enlarged cross-sectional view of another laminate film sheet of which a body-band label is made.

FIG. 4 shows another structure of film sheet 41 for the body-band label 30. The film sheet 41 comprises a laminate film sheet 42 with an adhesive layer 33 covered by a peel-apart type of protective film sheet 34. The laminate film sheet 32 comprises an outer film sheet 46 made of a transparent polystyrene film sheet (PS) and an inner film sheet 48 made of a polypropylene film sheet (PP) having a thickness less than approximately 60 $\mu$m. The inner film sheet 45 is coated with an aluminum layer 48 vapor deposited onto the front thereof. The aluminum deposition layer 48 is printed with a print layer 47 including decorative vignettes, a product name, a proprietary name and other logotypes, on the front thereof. The laminate film sheet 42 including the aluminum deposition layer 48 is preferably formed so as to have a tensile strength of approximately $7 \times 10^3$ N/m or higher and a bending moment of approximately $3 \times 10^{-4}$ N·m or less. The aluminum deposition layer 38 is effective to provide the laminate sheet 42 with a light shield. The laminate sheet 32 at its back is coated with an adhesive layer 33 covered by a protective film sheet 34.

The laminate film sheet 31 makes it possible to put a time consumable printing process last, which is always desirable for the laminate film sheets 31 to provide an increased productivity. In the case where productivity is not always the matter in hand, the print layer 37 may be formed on the aluminum deposition layer 38, which however requires employing a transparent polypropylene film sheet (PP) as the outer film sheet 35. Further, the outer and inner film sheets 35 and 36 may be made of a polystyrene film sheet (PS) and a polypropylene film sheet (PP), respectively.

On the other hand, in the laminate film sheet 41, the outer film sheet 46 made of a transparent polystyrene film sheet (PS) protects the print layer 47 as well as provides glossy outer appearance. The inner and outer film sheets 45 and 46 may be made of a transparent polystyrene film sheet (PS) and a polypropylene film sheet (PP), respectively.

A sheet for the body-band label 30 is not always formed from a laminate film sheet. made up of polypropylene and polystyrene film sheets (PP and PS) and may be made of a polypropylene film sheet (PP) only. In this instance, a polypropylene film sheet (PP) is coated with an aluminum deposition layer and printed with a print layer on the front and is provided with an adhesive layer covered by a peel-apart type of protective film sheet on the back. The polypropylene film sheet (PP) including the aluminum deposition layer is preferred to have a thickness less than approximately 60 $\mu$m, a tensile strength of approximately $7 \times 10^3$ N/m or higher and a bending moment of approximately $3 \times 10^{-4}$ N·m or less.

Strips cut from the laminate film sheet 31 or 41 are looped as a body-band label 30 so as to fit the generally rectangular box-shaped light tight outer shell of lens-fitted film unit 10. After peeling apart the protective film sheet 34, the looped body-band label 30 is fitted and firmly adhered to the outer shell of lens-fitted film unit 10.

After use, a lens-fitted film unit 10 is put to a photo-shop or a photo-laboratory where a film cartridge 24 is taken out from the lens-fitted film unit 10 for processing and printing. The processed film strip 26 in the cartridge 24 is returned to the customer and, on the other hand, the empty unit body 11 is collected by the manufacturer for recycling. At a recycling factory, after cutting off the body-band label 30 along top and bottom partition lines 11d between the front and rear covers 22 and 23, the front and rear covers 22 and 23 with pieces of the body-band label 30 are separated from the main body 21. Thereafter, the exposure unit 39 is detached from the main body 21 and forwarded for functional and appearance inspection. Perfect or faultless exposure unit 39 is reused as a part of a new lens-fitted film unit 10. The main body 21, which is protected by the front and rear covers 22 and 23 during entire use of the lens-fitted film unit 10 and reusable with a high probability, is forwarded for appearance inspection. Perfect or faultless main body 21 is reused as a part of a new lens-fitted film unit 10. On the other hand, faulty exposure units 39, faulty main bodies 21 and the remaining pieces and parts including front and ear covers 22 and 23 are forwarded to a recycling factory where they are melted and processed to provide pellets as a raw material for injection molding. The pieces of body-band label 30 are melted together with the covers 22 and 23.

In order to examine the looped body-band label 30 for its tensile strength and bending moment, measurements were made on five different samples of looped body-band labels S1–S5. The sample body-band label S1 was made of a polypropylene film sheet (PP) only and the remaining sample body-band labels S2–S5 were made of a laminate film sheet 31 such a shown in FIG. 3. The laminate film sheet 31 was comprised of a polypropylene film sheet (PP) having a thickness between 15 and 40 $\mu$m for the outer film sheet 35 and a polystyrene film sheet having a thickness between 30 and 50 82 m for the inner film sheet 36. An acrylic adhesive was employed for the adhesive layer 33. For comparative evaluation, a prior art looped body-band label SS made of a synthetic paper sheet ("YUPO") was prepared. The evaluation result is shown in the following Table I.

TABLE I

| | Body-Band Label of the Invention | | | | | Prior Art |
|---|---|---|---|---|---|---|
| | S1 | S2 | S3 | S4 | S5 | SS |
| Outer Film Sheet | PP | PP | PP | PP | YUPO | |
| Thickness ($\mu$m) | 40 | 30 | 25 | 20 | 15 | 80 |
| Inner Film Sheet | — | PS | PS | PS | PS | — |
| Thickness ($\mu$m) | | 30 | 30 | 40 | 50 | — |
| Tensile Strength (N/m × 10$^3$) | 10 | 9 | 8 | 7 | 6.4 | 10 |
| Bending Moment (N · 500 m × 10$^3$) | 0.4 | 1.7 | 1.7 | 2.0 | 2.5 | 3.6 |

Further, tests were made to evaluate suitability of the sample body-band labels S1–S5 and the prior art body-band label SS as lens-fitted film unit body-band label 35. The suitability was evaluated from the fact whether the sample body-band label S1–S5 caused lifting or partly peeled off from the outer shell while the lens-fitted film unit 10 was left in an atmosphere at approximately 60° C. for three days after a lapse of one day from the day on which it was fitted to the outer shell and whether the sample body-band label S1–S5 was torn on impact when it was spontaneously dropped from an approximately 1 meter height. The evaluation result is shown in the following Table II.

TABLE II

| | Body-Band Label of the Invention | | | | | Prior Art |
|---|---|---|---|---|---|---|
| | S1 | S2 | S3 | S4 | S5 | SS |
| Lifting or Peeling Off | None | None | None | None | None | Yes |
| Damaged (Tear) | Yes | Yes | Yes | Yes | Yes | None |

As clearly understood from Tables I and II, while the prior art sample body-band label SS whose bending moment is $3.6 \times 10^{-4}$ N·m causes lifting or peeling within three days while it is left in an atmosphere at approximately 60° C., however all of the sample body-band labels S1–S5 of the invention whose bending moment is less than $2.5 \times 10^{-4}$ N·m do not in any way experience any lifting or peeling. From the test result, it is proved that providing the body-band label 35 with a bending moment less than $2.5 \times 10^{-4}$ N·m assures prevention of lifting or peeling of the body-band label 35 from, in particular, curved portion of the outer shell of the lens-fitted film unit 10. Further, it is also apparent that, excepting the sample body-band label S5, the sample body-band labels S1–S4 of the invention whose tensile strength is greater than $7 \times 10^3$ N/m do are not in ant way damaged due to drop impact as well as the prior art whose tensile strength is $6.4 \times 10^3$ N/m. From the result, it is proved that providing the body-band label 35 with a tensile strength greater than $7 \times 10^3$ N/m assures prevention of damages of the body-band label 35 due to drop impact against the lens-fitted film unit 10.

In order to evaluate the compatibility of the polypropylene body-band label 35 with the polystyrene covers 22 and 23, the front and rear covers with each sample body-band label S1–S5, SS attached thereto were melted and made pellets. The compatibility of the polypropylene body-band label 35 with the polystyrene covers 22 and 23 was evaluated in three grades by examining changes in physical properties of the pellets as a polystyrene material for structural parts of the lens-fitted film unit 10. The evaluation result is shown in the following Table III together with the polypropylene content of the entire molten material in which a circle indicates that the recycled polystyrene material (PS) caused no change in physical properties, a triangle indicates that the recycled polystyrene material (PS) caused a change in physical properties but was practically reusable, and a cross symbol indicates that the recycled polystyrene material (PS) caused a change in physical properties too significant to be was reused.

TABLE III

| | Body-Band Label of the Invention | | | | | Prior Art |
|---|---|---|---|---|---|---|
| | S1 | S2 | S3 | S4 | S5 | SS |
| Polypropylene (PP) Content (Weight %) | 1.3 | 1.0 | 0.8 | 0.7 | 0.5 | — |
| Compatibility of Polypropylene (PP) with Polystyrene (PS) | Δ | Δ | ○ | ○ | ○ | x |

As clearly understood from Table III, the polypropylene body-band label affects the physical properties of recycled polystyrene material (PS) more significantly with an increase in the polypropylene content of the whole molten material as a polystyrene material and it is proved that when the polypropylene content of a molten polystyrene material is less than 0.8 weight %, the molten polypropylene material is well mixed with the molten polystyrene material without any adverse effect on the physical properties of polystyrene as a recycled polystyrene material for structural parts of the lens-fitted film unit 10.

As described above, according to the lens-fitted film unit 10 of the invention, the looped body-band label 35 made of a polypropylene film sheet having a thickness less than approximately 60 μm, a high tensile strength greater than approximately $7 \times 10^3$ N/m and a relatively low bending moment less than approximately $3 \times 10^{\times 4}$ N·m is prevented from lifting or peeling off from the outer shell of the lens-fitted film unit 10, in particular from curved portion of the outer shell, during use and damages due to drop impact. Further, the body-band label 35 made such that the polypropylene content of the body-band label 35 is less than 1.5 weight % with respect to the entire polystyrene material of the front and rear cover 22 and 33 yields improved compatibility with the front and rear covers 22 and 33 and prevents or significantly reduces changes in physical properties of the polystyrene material, which is significantly desirable for the front and rear covers 22 and 33 to be recycled and avoids the necessity of removing the body-band label 35 from the outer shell of the lens-fitted film unit 10 before recycling the empty unit body 11.

It is to be understood that the present invention may be embodied with various changes, modifications and improvements, which may occur to those skilled in the art, without departing from the spirit and scope of the invention defined in the following claims.

What is claimed is:

1. A lens-fitted film unit comprising:

a light tight unit body made up of a main body assembly including at least an exposure mechanism and injection molded polystyrene front and rear covers between which the main body assembly is interposed;

a roll of film installed into the main body assembly; and a looped body-band label fitted to said light tight unit body;

said looped body-band label being made of a polypropylene film sheet with a thickness less than approximately 60 μm, a tensile strength equal to or greater than approximately $7 \times 10^3$ N/m and a bending moment equal to or less than approximately $3 \times 10^{-4}$ N·m, and having a weight less than 1.5% with respect to a total weight of said injection molded polystyrene front and rear covers.

2. The lens-fitted film unit as defined in claim 1, wherein said polypropylene film sheet is coated with an adhesive layer of at least one of an acrylic group of adhesives and a rubber group of adhesives.

3. The lens-fitted film unit as defined in claim 2, wherein said adhesive layer is covered by a protective film sheet separable therefrom.

4. A lens-fitted film unit comprising:

a light tight unit body made up of a main body assembly including at least an exposure mechanism and injection molded polystyrene front and rear covers between which the main body assembly is interposed;

a roll of film installed into the main body assembly; and a looped body-band label fitted to said light tight unit body;

said body-band label being made of a laminate film sheet with a tensile strength equal to or greater than approximately $7 \times 10^3$ N/m and a bending moment equal to or less than approximately $3 \times 10^{-4}$ N·m which comprises an polypropylene film sheet with a thickness less than approximately 60 μm and a polystyrene film sheet and has a polypropylene content is less than 1.5 weight % with respect to a total weight of said injection molded polystyrene front and rear covers.

5. The lens-fitted film unit as defined in claim 4, wherein said laminate film sheet further comprises an aluminum deposition layer interposed between said polypropylene film sheet and said polystyrene film sheet.

6. The lens-fitted film unit as defined in claim 5, wherein said laminate film sheet is printed with at least one of logotypes and vignettes on an outer surface of either one of said polypropylene film sheet and said polystyrene film sheet and coated with an adhesive layer of at least one of an acrylic group of adhesives and a rubber group of adhesives on outer surface of another one of said polypropylene film sheet and said polystyrene film sheet.

7. The lens-fitted film unit as defined in claim 6, wherein said adhesive layer is covered by a protective film sheet separable therefrom.

8. The lens-fitted film unit as defined in claim 5, wherein said aluminum deposition layer is printed with at least one of logotypes and vignettes.

* * * * *